US011924210B2

(12) United States Patent
Zhang

(10) Patent No.: US 11,924,210 B2
(45) Date of Patent: Mar. 5, 2024

(54) PROTECTED RESOURCE AUTHORIZATION USING AUTOGENERATED ALIASES

(71) Applicant: Salesforce.com, Inc., San Francisco, CA (US)

(72) Inventor: Lionel Zhang, Bellevue, WA (US)

(73) Assignee: Salesforce, Inc.

( * ) Notice: Subject to any disclaimer, the term of this patent is extended or adjusted under 35 U.S.C. 154(b) by 85 days.

(21) Appl. No.: 17/248,239

(22) Filed: Jan. 15, 2021

(65) Prior Publication Data
US 2022/0232010 A1 Jul. 21, 2022

(51) Int. Cl.
*G06F 16/955* (2019.01)
*G06F 3/0482* (2013.01)
*G06F 16/23* (2019.01)
*H04L 9/40* (2022.01)

(52) U.S. Cl.
CPC .......... *H04L 63/102* (2013.01); *G06F 3/0482* (2013.01); *G06F 16/2379* (2019.01); *G06F 16/9566* (2019.01); *H04L 63/0884* (2013.01); *H04L 2463/082* (2013.01)

(58) Field of Classification Search
CPC ............... H04L 63/102; H04L 63/0884; H04L 2463/082; G06F 16/2379; G06F 16/9566; G06F 3/0482
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |

(Continued)

OTHER PUBLICATIONS

Chase McCoy, "Generating friendly, unique identifiers," Nov. 10, 2019, available at https://web.archive.org/web/20200810103242/https://chasem.co/2019/11/friendly-ids/ (Year: 2019).*

(Continued)

*Primary Examiner* — Andrew T Chiusano
(74) *Attorney, Agent, or Firm* — Lorenz & Kopf, LLP

(57) ABSTRACT

Database systems and methods are provided for authorizing access to a protected resource. One method involves an authorization service automatically assigning a unique alias to a web application and thereafter receiving a request for access to a protected resource on behalf of a user of the web application. In response to the request, the authorization service generates a graphical user interface (GUI) display including a graphical representation of the unique alias automatically assigned to the web application at a client device associated with the user, and thereafter in response to user selection of a GUI element of the GUI display to authorize access, the authorization service obtains an access token associated with the user and the protected resource and transmits the access token to the web application.

20 Claims, 9 Drawing Sheets

(56) References Cited

U.S. PATENT DOCUMENTS

| | | |
|---|---|---|
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,454,437 B1 * | 11/2008 | Lavallee ............. H04L 61/3025 707/999.105 |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,793,509 B1 * | 7/2014 | Nelson ................. G06F 21/335 713/193 |
| 8,984,640 B1 * | 3/2015 | Emigh .................. H04B 1/667 726/13 |
| 9,176,720 B1 * | 11/2015 | Day-Richter ............. G06F 8/63 |
| 9,756,012 B1 * | 9/2017 | Pandya ............. H04L 61/4511 |
| 10,754,983 B2 * | 8/2020 | Mahonin ............... G06F 21/602 |
| 11,381,405 B1 * | 7/2022 | Sundaresan ........... H04L 63/083 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0110469 A1 * | 5/2012 | Magarshak ......... H04L 63/0421 715/747 |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247030 A1 * | 9/2013 | Kay ................... H04L 63/1441 717/178 |
| 2013/0247216 A1 | 9/2013 | Cinarkaya et al. |

(56) References Cited

U.S. PATENT DOCUMENTS

| | | | | |
|---|---|---|---|---|
| 2015/0365420 A1* | 12/2015 | Kochhar | ............... | H04W 12/06 |
| | | | | 726/6 |
| 2017/0237727 A1* | 8/2017 | Kapoor | ................ | H04L 63/083 |
| | | | | 726/4 |
| 2020/0211098 A1* | 7/2020 | Miyamoto | ............ | H04L 9/3213 |
| 2021/0409412 A1* | 12/2021 | Mohamed | ............. | H04L 63/101 |

OTHER PUBLICATIONS

D. Hardt, ED, The OAuth 2.0 Authorization Framework, Internet Engineering Task Force (IETF), ISSN: 2070-1721, Oct. 2012.

* cited by examiner

Setup
App Manager

New Connected App

Save  Cancel

To publish an app, you need to be using a Developer Edition organization with a namespace prefix chosen.

Help for this Page

Basic Information

| | | |
|---|---|---|
| Connected App Name | The TrustworthyApp | |
| API Name | The TrustworthyApp | |
| Contact Email | admin@peak.org | — 406 |
| Contact Phone | | |
| Logo Image URL | Upload logo image or Choose one of our sample logos | |
| Icon URL | Choose one of our sample logos | |
| Info URL | | |
| Description | | |

402

I = Required Information

API (Enable OAuth Settings)

| | |
|---|---|
| Enable OAuth Settings | ☑ |
| Enable for Device Flow | ☐ |
| Callback URL | https://the-trustworthy-app.com/oauth/callback |
| Use digital signatures | ☐ |

404

Selected OAuth Scopes

Available OAuth Scopes

Access Pardot services (pardot_api)
Access and manage your Chatter data (chatter_api)
Access and manage your Eclair data (eclair_api)
Access and manage your Wave data (wave_api)
Access and manage your data (api)
Access custom permissions (custom_permissions)
Access your basic information (id, profile, email, address, phone)
Allow access to Lightning applications (lightning)
Allow access to content resources (content)
Full access (full)

Add  ▲▼
Remove

Selected OAuth Scopes

Allow access to your unique identifier (openid)

Setup
Manage Connected Apps

Connected App Name
The TrustworthyApp (alias: Standard Chaos) ← 502
«Back to List: Custom Apps   [Edit] [Delete] [Manage]

Allow from 2-10 minutes for your changes to take effect on the server before using the connected app.

| | | | | |
|---|---|---|---|---|
| Version | 1.0 | | | |
| API Name | TheTrustworthyApp | | | |
| Created Date | 1/7/2021, 3:51 PM | By: Admin User | | |
| Contact Email | admin@peak.org | | | |
| Contact Phone | 1/7/2021, 3:51 | | | |
| Last Modified Date | | By: Admin User | | |
| Description | | | | |
| Info URL | | | | |

▼ API (Enable OAuth Settings)

| | | | |
|---|---|---|---|
| Consumer Key | 3MVG9jqkKMKuRGRGcbs9yQ62.zPY9cfyWpxhHYrHqzK6lUQmHOxXRFrOGVBpCxH6VzDj0Bb_CgnhrdNStbM7qWMMX [Copy] | Consumer Secret | Click to reveal |
| Selected OAuth Scopes | Allow access to your unique identifier (openid) | Callback URL | https://the-trustworthy-app.com/oauth/callback |
| Enable for Device Flow | ☐ | Require Secret for Web Server Flow | ☑ |
| Require Secret for Refresh Token Flow | ☑ | Introspect All Tokens | ☐ |
| Token Valid for | 0 Hour(s) | Include Custom Attributes | ☐ |
| Include Custom Permissions | ☐ | Enable Single Logout | Single Logout disabled |

▼ Initial Access Token for Dynamic Client Registration
Initial Access Token   [Generate]

▼ Custom Connected App Handler
Apex Plugin Class
Run As

Trusted IP Range for OAuth Web Server Flow   [New]
No records to display

Custom Attributes   [New]
No records to display

FIG. 5

PROTECTED RESOURCE AUTHORIZATION USING AUTOGENERATED ALIASES

TECHNICAL FIELD

One or more implementations relate to the field of database systems, and more specifically, to authorizing access to protected resources using autogenerated aliases to improve security.

BACKGROUND

Modern software development has evolved towards web applications or cloud-based applications that provide access to data and services via the Internet or other networks. Often, it is desirable to retrieve or incorporate a user's data or information from various different third party websites or platforms into a web application in order to enhance or otherwise improve the user experience. As a result, various protocols have been developed to facilitate sharing an individual user's information across different websites and applications. Often, the sharing of user information is conditioned on the user granting permission or otherwise authorizing the sharing. However, individuals may be susceptible to spoofing or phishing attacks, thereby creating a potential vulnerability for compromising user data. Accordingly, it is desirable to facilitate authorizing access to third party user data in a more secure manner.

BRIEF DESCRIPTION OF THE DRAWINGS

The following figures use like reference numbers to refer to like elements. Although the following figures depict various example implementations, alternative implementations are within the spirit and scope of the appended claims. In the drawings:

FIGS. 4-8 depict a sequence of web page graphical user interface (GUI) displays suitable for presentation on a client device in the computing system of FIG. 1 in connection with the authorization process of FIG. 1 according to some example implementations;

DETAILED DESCRIPTION

The subject matter described herein generally relates to authorizing access to protected resources in a secure manner using autogenerated aliases. As described in greater detail below, in one or more implementations, an authorization service automatically generates and assigns an alias to an application, and the autogenerated alias can then be presented and utilized by a user (or resource owner) to confirm that the application was created by an authentic developer or party (e.g., by that developer or party independently communicating the assigned alias to the user in advance of or concurrent to the authorization request) before allowing access to any protected resources associated with the user at a third party location. In this regard, a protected resource may be any sort of data, information, data structure, database record, object, file or the like that is owned by or otherwise associated with the user or other resource owner and to which access by others may be prevented or restricted. The autogenerated alias prevents malicious actors from gaining access to a user's protected resource(s) using name spoofing, typosquatting, or otherwise phishing using names or other identifiers associated with authentic or legitimate developers, applications, and the like.

In one or more implementations, an authorization service automatically generates and assigns a unique human-readable alias to a web application when the web application is registered with the authorization service. Thereafter, in response to receiving a request for access to a protected resource on behalf of a user of an instance of the web application, the authorization service generates a graphical user interface (GUI) display including a graphical representation of the unique human-readable alias automatically assigned to the web application at a client device associated with the user. The user may then read and analyze the unique alias assigned to the web application to verify or otherwise confirm authenticity of the web application before granting access to a protected resource associated with the user at a third party location. In this regard, when the user does not recognize the alias, the user may decline to grant access, thereby ensuring security of the user's protected resources at third party locations from potentially malicious actors. After verifying or confirming the authenticity or legitimacy of the web application, the user selects a GUI element of the GUI display to authorize access, and in response, the authorization service issues or otherwise obtains an access token associated with the user and the protected resource and transmits or otherwise provides the access token to the instance of the web application, which, in turn, utilizes the access token to retrieve user data from a third party website, application platform, database system, and/or the like.

Figure 1:
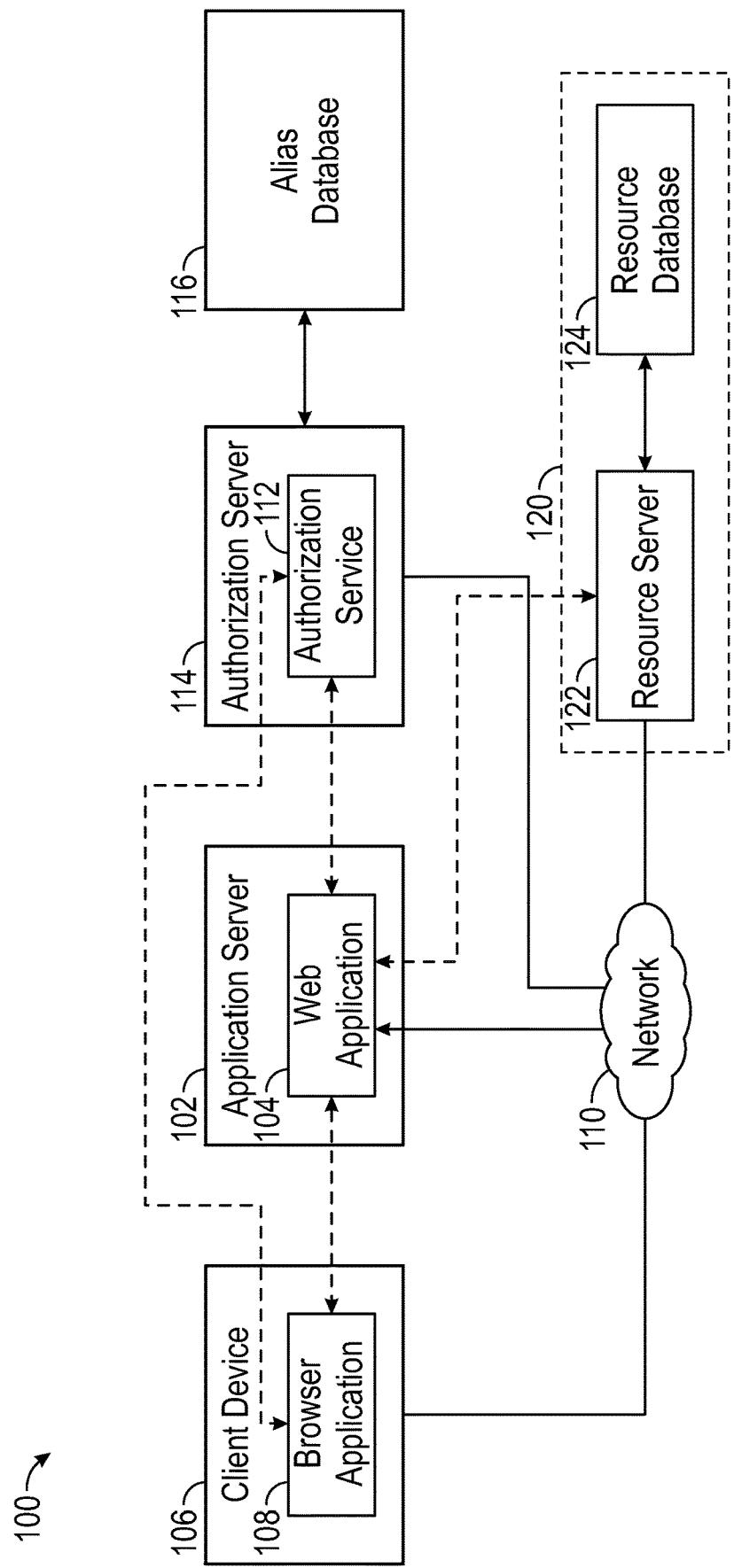
FIG. 1 is a block diagram illustrating a computing system according to some example implementations.

FIG. 1 depicts an exemplary system 100 for authorizing access to a protected resource over a network, such as, for example, a third party system that securely maintains data or other information associated with users. It should be appreciated that FIG. 1 depicts a simplified representation of the system 100 for purposes of explanation and is not intended to be limiting.

The system 100 includes an application server 102 configurable to provide instances of a web application 104 within client applications 108 executed on client devices 106 communicatively coupled to the application server 102 via a communications network 110, such as the Internet or any sort or combination of wired and/or wireless computer network, a cellular network, a mobile broadband network, a radio network, or the like. In one or more implementations, the web application 104 is realized as a virtual application generated at run-time or on-demand. As described in greater below, the web application 104 utilizes an authorization service 112 provided by an authorization server 114 to facilitate a user of the client device 106 conditionally granting authorization to the web application 104 for accessing the data, information, or other protected resources associated with the user that are maintained by a third party computing system 120. In this regard, the authorization service 112 utilizes a unique human-readable alias assigned to the web application 104 and maintained in an alias database 116 in association with the web application 104 to generate an authorization request GUI display including a graphical representation of the alias, which, in turn, may be utilized by the user to verify or otherwise confirm the authenticity of the web application 104 before authorizing the web application 104 to access a protected resource. Once the user authorizes the web application 104, the authorization service 112 provides a token or other credential to the web application 104, which may then be utilized by the web application 104 to retrieve data and/or information associated with the user from a third party computing system 120.

The client device 106 generally represents an electronic device coupled to the network 110 that may be utilized by a user to access the web application 104 on the application server 102 and utilize the web application 104 to retrieve, view, and/or otherwise access data associated with the user that resides at a third party computing system 120 via the network 110. In practice, the client device 106 can be realized as any sort of personal computer, mobile telephone, tablet or other network-enabled electronic device. In exemplary embodiments, the client device 106 includes a display device, such as a monitor, screen, or another conventional electronic display, capable of graphically presenting data and/or information provided by the web application 104 along with a user input device, such as a touchscreen, a touch panel, a mouse, a joystick, a directional pad, a motion sensor, or the like, capable of receiving input from the user of the client device 106. The illustrated client device 106 executes or otherwise supports a client application 108 that communicates with the web application 104 on the application server 102 using a networking protocol. In some implementations, the client application 108 is realized as a web browser or similar local client application executed by the client device 106 that contacts the application server 102 and/or the web application 104 using a networking protocol, such as the hypertext transport protocol (HTTP) or the like, to access or otherwise initiate an instance of the web application 104 being presented on the client device 106 (e.g., by or within the client application 108).

The application server 102 generally represents a server computing device, server computing system or another combination of processing logic, circuitry, hardware, and/or other components configured to support the web application 104 and related authorization processes, tasks, operations, and/or functions described herein. In this regard, the application server 102 generally includes a processing system, which may be implemented using any suitable processing system and/or device, such as, for example, one or more processors, central processing units (CPUs), controllers, microprocessors, microcontrollers, processing cores and/or other hardware computing resources configured to support the operation of the processing system described herein. The processing system may include or otherwise access a data storage element (or memory) capable of storing programming instructions for execution by the processing system, that, when read and executed, are configurable cause processing system to create, generate, or otherwise facilitate an application platform that generates or otherwise provides instances of a web application 104 at run-time (or "on-demand") based at least in part upon code and other data that is stored or otherwise maintained by the memory, a database, or another location on the network 110 and support the authorization processes described herein. Depending on the embodiment, the memory may be realized as a random access memory (RAM), read only memory (ROM), flash memory, magnetic or optical mass storage, or any other suitable non-transitory short or long term data storage or other computer-readable media, and/or any suitable combination thereof.

Similar to the application server 102, the authorization server 114 generally represents a server computing device, server computing system or another combination of processing logic, circuitry, hardware, and/or other components configured to automatically generate and assign unique human-readable aliases to web applications and support the related authorization processes, tasks, operations, and/or functions described herein. In this regard, the authorization server 114 generally includes a processing system, which may be implemented using any suitable processing system and/or device, such as, for example, one or more processors, central processing units (CPUs), controllers, microprocessors, microcontrollers, processing cores and/or other hardware computing resources configured to support the operation of the processing system described herein. The processing system may include or otherwise access a data storage element (or memory) capable of storing programming instructions for execution by the processing system, that, when read and executed, are configurable cause processing system to create, generate, or otherwise facilitate the authorization service 112 that supports the authorization processes described herein based at least in part upon code and other data that is stored or otherwise maintained by the memory and/or the alias database 116.

In the illustrated implementation depicted in FIG. 1, the third party computing system 120 includes a resource server 122 communicatively coupled to the network 110 to support access to individual users' data, information, or other protected resources maintained in a resource database 124. In this regard, the resource server 122 generally represents a server computing device, server computing system or another combination of processing logic, circuitry, hardware, and/or other components configured to support remote access to data maintained in the resource database 124 via the network 110. For example, the resource database 124 may maintain, on behalf of a user (or resource owner), data records entered or created by the user, files, objects or other records uploaded by the user, and/or files, objects or other records generated by one or more computing processes (e.g., by the resource server 122 based on user input or other records or files stored in the database 124). In practice, the third party computing system 120 is physically and logically distinct from the application server 102 and the authorization server 114. In exemplary implementations, the third party computing system 120 resides at a different physical location than the application server 102 and is owned, controlled, or otherwise operated by a third party different from the different parties that own, control and/or operate the application server 102. In some implementations, the authorization server 114 is affiliated with the same party that owns, controls and/or operates the third party computing system 120. That said, in various implementations, the authorization server 114 resides at a different physical location than the third party computing system 120 and/or the authorization server 114 is owned, controlled, or otherwise operated by another party that is independent and different from the operator of the third party computing system 120 and the developer operator of the application server 102. In exemplary implementations, the resource server 122 at the third party computing system 120 is cooperatively configured to accept access tokens or other credentials issued by the authorization service 112 in response to a user providing consent for the web application 104 to access the resource database 124, as described in greater detail below.

In one or more embodiments, the third party computing system 120 is realized as an on-demand multi-tenant database system that is capable of dynamically creating and supporting virtual applications based upon data from a common resource database 124 that is shared between multiple tenants, which may alternatively be referred to herein as a multi-tenant database. Data and services generated by the virtual applications may be provided via the network 110 to any number of client devices, as desired. Each virtual application may be suitably generated at runtime (or on-demand) using a common application platform that securely provides access to the data in the database 124 for each of the various tenants subscribing to the multi-tenant system. In accordance with one non-limiting example, the third party computing system 120 is implemented in the form of an on-demand multi-tenant customer relationship management (CRM) system that can support any number of authenticated users of multiple tenants. In this regard, one or more implementations of the third party computing system 120 support one or more application program interfaces (APIs) at the resource server 122 that allow other web applications 104 and/or application servers 102 on the network 110 that have been authorized by the authentication service 112 to access and perform operations with respect to individual tenant's data maintained in the database 124 that would otherwise be secured and inaccessible to unauthorized third parties.

Figure 2:
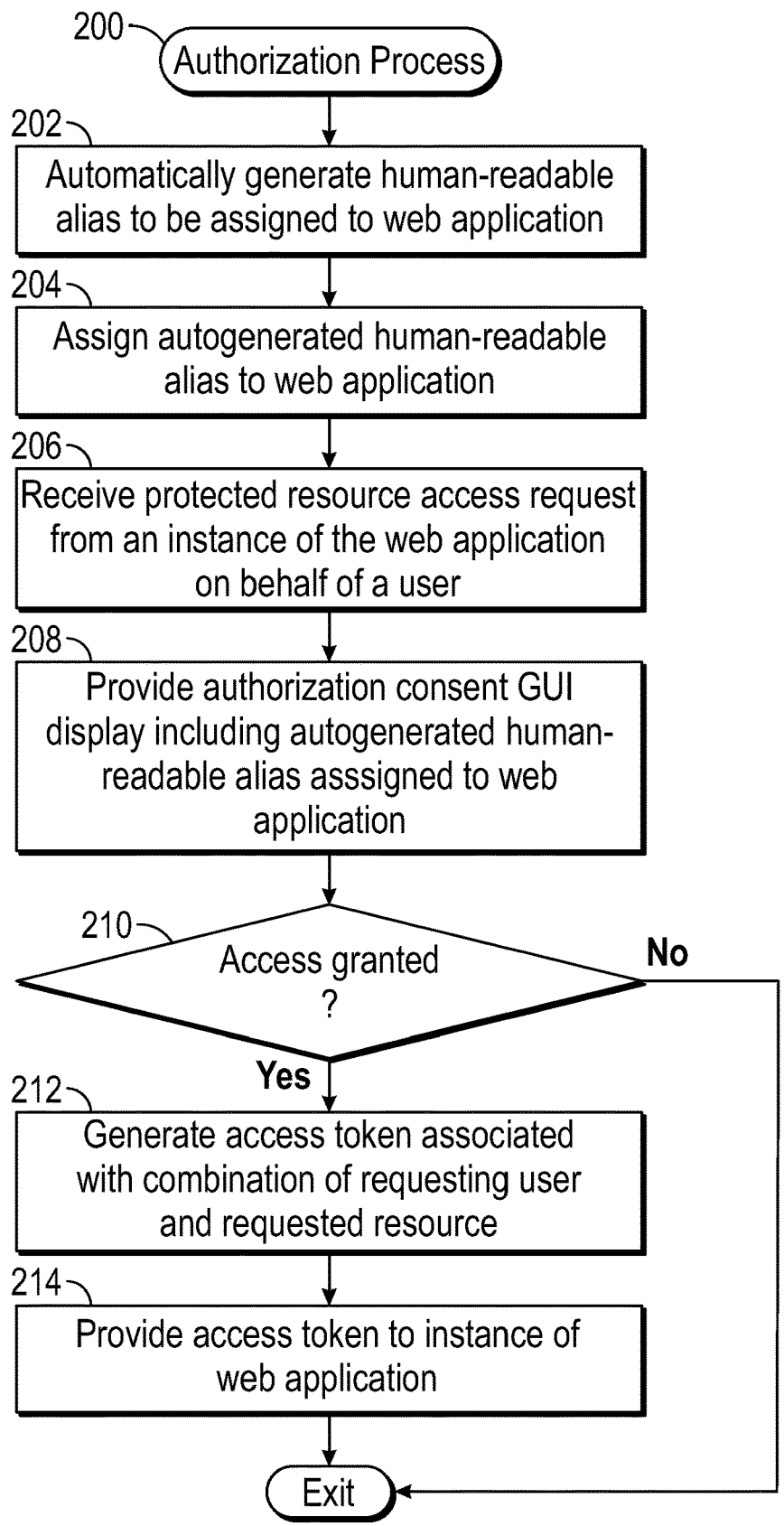
FIG. 2 is a flow diagram illustrating an authorization process suitable for use with the computing system according to some example implementations.

FIG. 2 depicts an exemplary authorization process 200 that may be implemented or otherwise performed by a computing system to securely authorize access to protected resources and perform additional tasks, functions, and/or operations described herein. For illustrative purposes, the following description may refer to elements mentioned above in connection with FIG. 1. In this regard, while portions of the authorization process 200 may be performed by different elements of the computing system 100, for purposes of explanation, the subject matter is described herein in the context of the authorization process 200 being primarily performed by the authorization service 112 and the authorization server 114. It should be appreciated that the authorization process 200 may include any number of additional or alternative tasks, the tasks need not be performed in the illustrated order and/or the tasks may be performed concurrently, and/or the authorization process 200 may be incorporated into a more comprehensive procedure or process having additional functionality not described in detail herein. Moreover, one or more of the tasks shown and described in the context of FIG. 2 could be omitted from a practical embodiment of the authorization process 200 as long as the intended overall functionality remains intact.

The illustrated authorization process 200 initializes or otherwise begins by automatically generating or otherwise creating a unique human-readable alias for a web application and assigning or otherwise associating the unique human-readable alias with the web application for subsequent authorization requests (tasks 202, 204). For example, a developer, creator, or other operator associated with the web application 104 and/or the application server 102 may transmit or otherwise provide a request to the authorization service 112 on the authorization server 114 to register the web application 104 for subsequent authorization requests. In this regard, the developer may interact with a browser or similar client application navigate to a web page or other network address associated with the authorization service 112 and provide a request or other indicia of a desire to register the web application 104 with the authorization service 112 (e.g., by providing a domain name, uniform resource locator (URL), network address, and/or other identifiers associated with the web application 104). In response to receiving the registration request, the authorization service 112 automatically generates a unique human-readable alias to be assigned to the web application 104 and updates the alias database 116 to include an entry that maintains an association between the autogenerated human-readable alias and the identifying information associated with the web application 104. The authorization service 112 also updates the web page or GUI display provided to the developer to inform the developer of the alias assigned to the web application 104, which, in turn, may be communicated by the developer to end users to enable the users identifying the web application 104 as being authenticated by the developer, as described in greater detail below. In some implementations, upon registration of the web application 104, the authorization service 112 may also provide a URL or other network address to be used by the web application 104 to redirect client applications 108 to an authorization consent web page provided by the authorization service 112 and/or the authorization server 114, as described in greater detail below. That said, in practice, the URL or other network address to be used by the web application 104 to redirect client applications 108 may be obtained from published documentation associated with the authorization service 112.

The autogenerated alias is human-readable and different from the name or other unique identifiers defined for the web application 104. In exemplary implementations, the autogenerated alias includes one or more terms, which may be realized as any sort or combination of alphanumeric or unicode words, symbols, numbers or characters that are space-delimited or otherwise logically separated so that a human user can read and identify the separate and distinct terms (e.g., words, symbols, numbers, characters, etc.) that make up the alias. It should be noted that there are numerous different techniques or schemes that may be employed by the authorization service 112 to automatically generate an alias, and the subject matter described herein is not limited to any particular implementation. For example, in one implementation, the alias may be generated by randomly selecting words from different pools of potential words for use in the alias, for example, by the authorization service 112 automatically and randomly selecting an adjective (e.g., the word "standard") from a group of potential adjectives, automatically and randomly selecting a noun (e.g., the word "chaos") from a group of potential nouns, and combining the randomly selected adjective with the randomly selected noun to arrive at a random autogenerated human-readable alias (e.g., "Standard Chaos"). In another implementation, the alias may be generated by randomly selecting one or more words from one or more different groups of potential words and combining the randomly selected word(s) with one or more numbers that may be automatically and/or randomly generated, for example, by using a secure or cryptographic hash function (e.g., on the timestamp or other information contemporaneous to the registration request). After generating an alias, prior to assigning the alias, the authorization service 112 queries or otherwise searches the alias database 116 for any existing uses of that alias to ensure the alias is unique among registered applications. In this regard, when an existing usage of an autogenerated alias exists, the authorization service 112 discards the alias and repeats the steps for generating a new alias until arriving at a unique alias that is not currently in use and/or registered in the alias database 116. After confirming the autogenerated human-readable alias is unique, the authorization service 112 creates a new entry in the alias database 116 that maintains an association between the newly autogenerated unique human-readable alias and identifying information associated with the web application 104 to be registered in association with the alias, thereby assigning the autogenerated alias to the web application 104.

It should be noted that in some implementations, the authorization service 112 may allow the developer user to configure or otherwise control a portion of the autogenerated alias. For example, the developer user may be capable of using the web page or GUI display provided by the authorization service 112 to select, define, provide or otherwise configure a word, phrase, number, character or symbol that the developer user would like to be part of the alias, with the authorization service 112 automatically generating the remaining words, phrases, numbers, characters and/or symbols to be combined with the user-configurable portion of the alias to arrive at a unique autogenerated human-readable alias that includes a portion that was configured by the developer. In yet other embodiments, the authorization service 112 may allow different third parties to create or otherwise define different naming policies to be utilized for authorizing access to their respective third party computing system 120, which, in turn, may be utilized by the authorization service 112 when autogenerating aliases to be utilized for accessing those third party systems 120. For example, the administrator, owner, or operator of the third party computing system 120 may define a naming policy that requires the autogenerated alias to include a particular number of words, a particular minimum and/or maximum number of characters per word of the alias, a particular type and/or combination of words to be included in the alias (e.g., nouns, adjectives, verbs, adverbs, etc.), a particular number of numbers to be included in the alias, a particular number of digits per number of the alias, and/or the like. In some implementations, the registration request from the web application 104 may identify the third party computing system 120 or protected resource for which access is to be requested, which, in turn, may be utilized by the authorization service 112 to automatically generate and assign an alias to the web application 104 in accordance with the naming policy defined for that third party computing system 120 or protected resource. In one or more implementations, the authorization service 112 may generate multiple different potential aliases, from among which the developer user may select a preferred autogenerated alias for assignment or provide a selectable GUI element for the developer user to indicate a desire for the authorization service 112 to regenerate additional potential aliases until arriving at an autogenerated alias that is satisfactory to the developer user.

Still referring to FIG. 2, after registering and assigning an alias to an application, the authorization process 200 continues by receiving or otherwise obtaining a request for authorization to access a protected resource by an instance of the application on behalf of a particular end user or client, and in response to the protected resource authorization request, generating or otherwise providing an authorization consent GUI display that includes a graphical representation or other indicia of the autogenerated alias assigned to the application (tasks 206, 208). In this regard, a user of a client device 106 may utilize a web browser or other client application 108 to access the application server 102 to generate an instance of the web application 104 at or within the client application 108, which the user can then interact with or otherwise utilize in a manner that triggers a request to incorporate the user's protected data or information maintained at a third party computing system 120 within the instance of the web application 104. In response, the instance of the web application 104 generates or otherwise provides a URL or other network address to redirect the client application 108 to a web page associated with the authorization service 112. For example, in one implementation, the web application 104 utilizes URL or other network address provided by the authorization service 112 during registration of the web application 104 to redirect the client application 108 to an authorization consent web page provided by the authorization service 112 and/or the authorization server 114. When the client application 108 accesses the URL or other network address associated with the authorization service 112 via the network 110, the authorization service 112 generates or otherwise provides an authorization consent GUI display within the client application 108. The authorization consent GUI display depicts, presents, or otherwise displays the unique human-readable autogenerated alias assigned to the web application 104 along with other information identifying the developer associated with the web application 104, the protected third party resources to be accessed by the web application 104, the permissions to be granted to the web application 104, and/or the like.

After presenting the authorization consent GUI display, the authorization process 200 waits to verify or otherwise confirm whether the end user authorizes the application to access the end user's protected resources (task 210). For example, the authorization consent GUI display may include a button or similar selectable GUI element that must be selected, manipulated, or otherwise activated by the user to authorize the web application 104 accessing the third party computing system 120. In response to receiving indication that the user authorizes the application to access a protected resource, the authorization process 200 continues by obtaining an access token or other credential required for accessing the protected resource and transmitting or otherwise providing the access token to the requesting instance of the application to enable the application to access the protected resource (tasks 212, 214). In the absence of an indication of the user authorizing the application to access a protected resource, the authorization process 200 terminates or exits without the authorization service 112 providing an access token to the web application 104. For example, when the user does not recognize the alias assigned to the web application 104, the user may select another button or selectable GUI element to indicate the user would like to deny authorization or otherwise cancel or prevent access to the user's protected resources.

In exemplary implementations, the authorization service 112 generates or otherwise obtains an access token that is associated with the resource server 122 and/or the resource database 124 to be accessed and the particular user that authorized or otherwise consented to accessing the resource server 122 and/or the resource database 124. In this regard, the access token may be independently and dynamically generated by the authorization service 112 at run-time, and in exemplary implementations, the access token identifies: (1) the authorization service 112 that is the source of the access token; (2) the web application 104 that has been authorized by the authorization service 112; (3) the user that has authorized access; (4) the resource database 124 or other protected resource that is subject of the authorization; (5) the data and/or functionality for which the web application 104 has been authorized by the user to access and/or perform with respect to the resource database 124 or other protected resource; and (6) any additional conditions on the web application 104 accessing data and/or performing functionality with respect to the resource database 124 or other protected resource, if applicable. For example, in one implementation, the authorization service 112 generates the authorization information and stores or otherwise writes the authorization information to a row in a database that is accessible to the resource server 122 and provides the access token to the web application 104 as a string that identifies the row in the database from which the resource server 122 can retrieve the authorization information (e.g., the source of the access token, the authorized web application, the user that has authorized access, the protected resource that is subject of the authorization, etc.). The resource server 122 then utilizes the access token string to retrieve the authorization information and verifying access is authorized before executing the request from the web application 104. In some implementations, the access token or authorization information may include the alias assigned to the web application 104 to indicate how the web application 104 was authorized (e.g., for purposes of audit logs or other analysis). That said, numerous different techniques or schemes for generating authorized access tokens exist, the details of which are not germane to this disclosure, and the subject matter described herein is not limited to any particular technique or scheme for generating an access token.

The authorization service 112 transmits or otherwise provides the access token to the instance of the web application 104, which, in turn utilizes the access token to access and retrieve data or information associated with the user from the resource database 124 via the resource server 122 and the network 110 for presentation within the instance of the web application 104 within the client application 108. For example, the authorization service 112 may dynamically generate the access token based on at least one of the identity of the web application 104 requesting access, the protected resource requested for access, the permissions requested, and potentially other factors, then retrieve the callback URL registered or otherwise associated with the web application 104 from the alias database 116 and redirect the browser application 108 to the callback URL associated with the web application 104 with the access token provided as a URL parameter (e.g., by appending the access token string to the callback URL). The access token portion of the URL address is processed by the web application 104 and/or the browser application 108 (e.g., based on web page code associated with the callback URL) before generating the resulting web page that includes or otherwise incorporates data associated with the protected resource. For example, the web application 104 may make an API call to the resource server 122 using the access token (e.g., by directly including the token in the call, computing proof of ownership based on the access token and including the computed proof of ownership in the call, etc.) to thereby generate or otherwise provide a query for retrieving the user's data from the resource database 124 and/or the resource server 122 that includes the access token. The resource server 122 may then respond to the API call by utilizing the access token (or computed proof of ownership thereof) to verify that the query is authorized before retrieving the user's protected data or otherwise performing operations with respect to the user's data in the resource database 124. The resource server 122 may then transmit or otherwise provide the user's protected data or information obtained from the resource database 124 back to the web application 104 via the network 110. In response to receiving the requested data, the instance of the web application 104 may dynamically update the web application GUI display presented within the client application 108 to incorporate, include, or otherwise reflect the third party data retrieved from the third party computing system 120.

Figure 3:
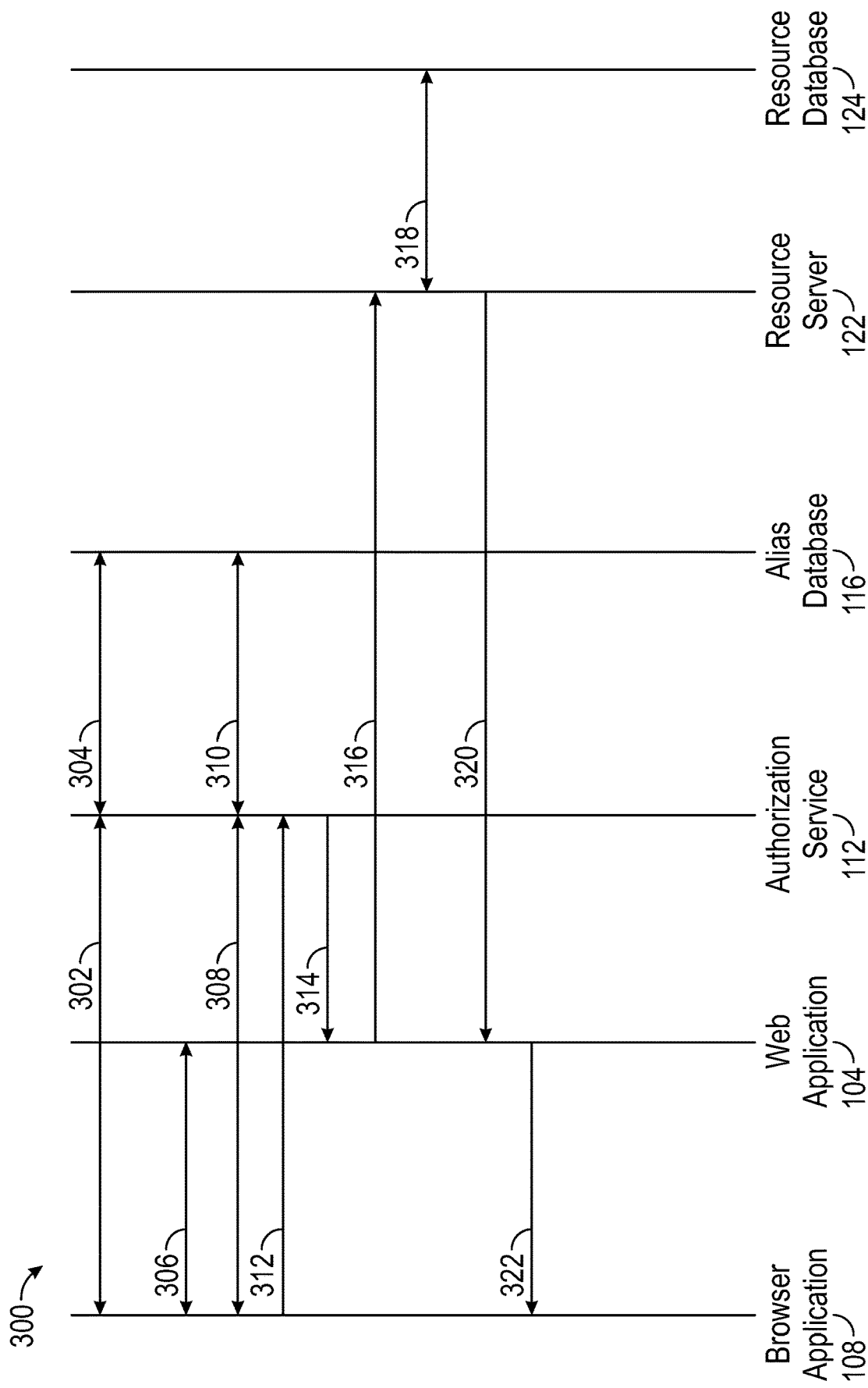
FIG. 3 is a sequence of communications within the computing system of FIG. 1 in connection with the authorization process of FIG. 1 according to some example implementations.

FIG. 3 depicts an exemplary sequence 300 of communications or other tasks or operations that may be performed in the computing system 100 of FIG. 1 in connection with the authorization process 200 of FIG. 2 in accordance with one or more implementations, and FIGS. 4-8 depict GUI displays that may be presented within the client application 108 on the client device 106 in connection with the authorization process 200. The illustrated communications sequence 300 begins by a developer, creator, or other operator associated with the web application 104 and/or the application server 102 utilizing a respective instance of a client device 106 to provide 302 a registration request to the authorization service 112 on the authorization server 114 to register the web application 104 for subsequent authorization requests. For example, referring to FIG. 4, a developer user of a client device 106 may utilize a client application 108 to access a URL or other network location associated with the authorization service 112 and/or the authorization server 114, which, in turn, generates or otherwise provides a registration web page GUI display 400 that includes text boxes or other GUI elements 402, 404, 406 for the developer user to define or otherwise provide the name of the web application 104 (e.g., Connected App Name box 402), the callback URL for the web application 104 after authorization (e.g., Callback URL box 404), an email address or other contact information associated with the web application 104 (e.g., Contact Email box 406), and the like.

After the developer user defines values for the required fields to register the web application 104, the authorization service 112 automatically generates a unique human-readable alias to be assigned to the web application 104 (e.g., task 202), updates the alias database 116 by creating 304 a new entry associated with the web application 104 that maintains an association between the autogenerated human-readable alias and the identifying information associated with the web application 104 (e.g., task 204), and provides indication of the assigned alias back to the developer, creator, or other operator associated with the web application 104 and/or the application server 102. For example, as shown in FIG. 5, the authorization service 112 and/or the authorization server 114 may generate an updated registration web page GUI display 500 within the client application 108 at the client device 106 that includes a graphical representation 502 of the autogenerated alias assigned to the web application 104 (e.g., "Standard Chaos"). The developer communicates the alias assigned to the web application 104 to clients or end users for subsequently authorizing the web application 104. For example, in some implementations, the assigned alias is communicated independently of the web application 104 (e.g., via e-mail, text message, phone call, or the like).

Figure 6:
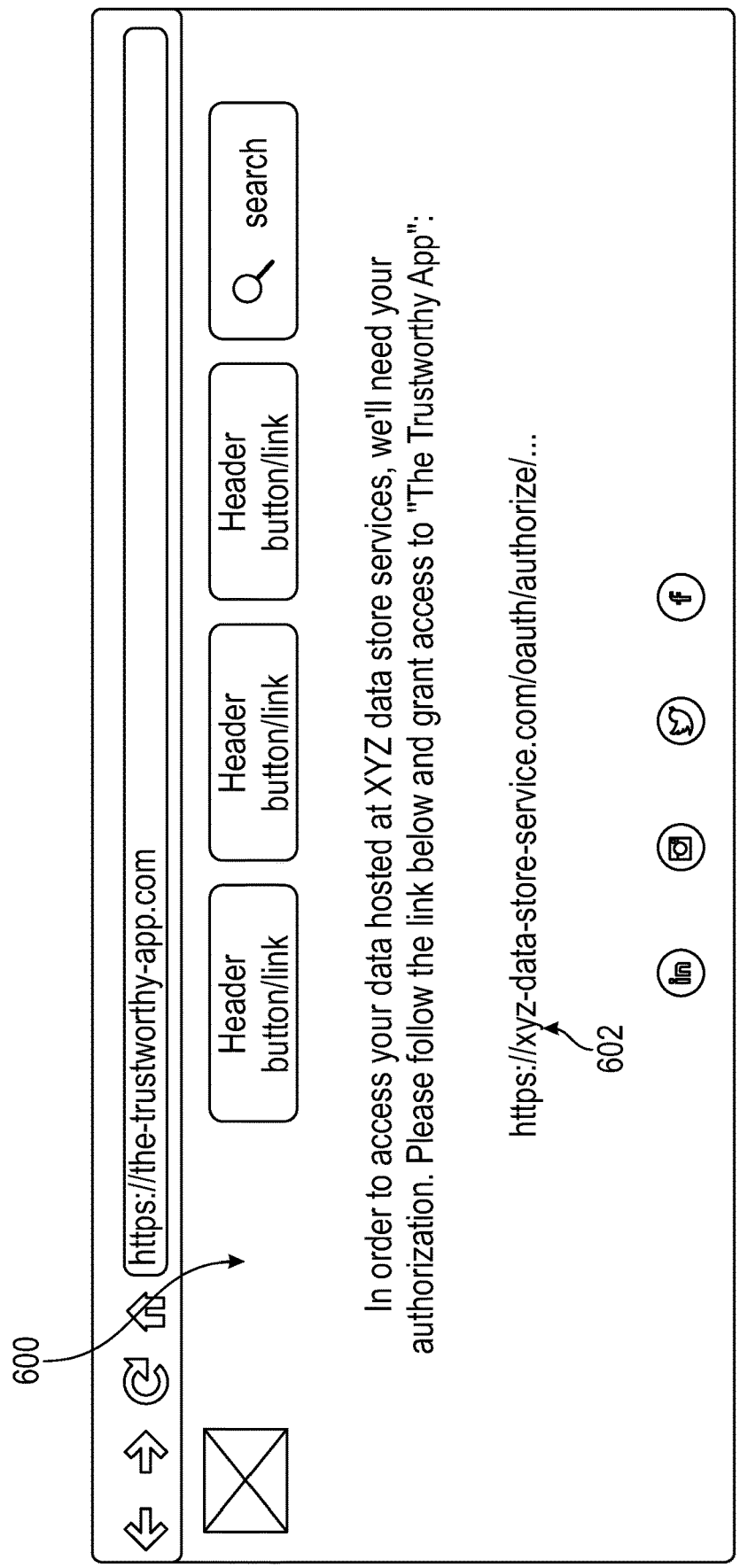
Figure 7:
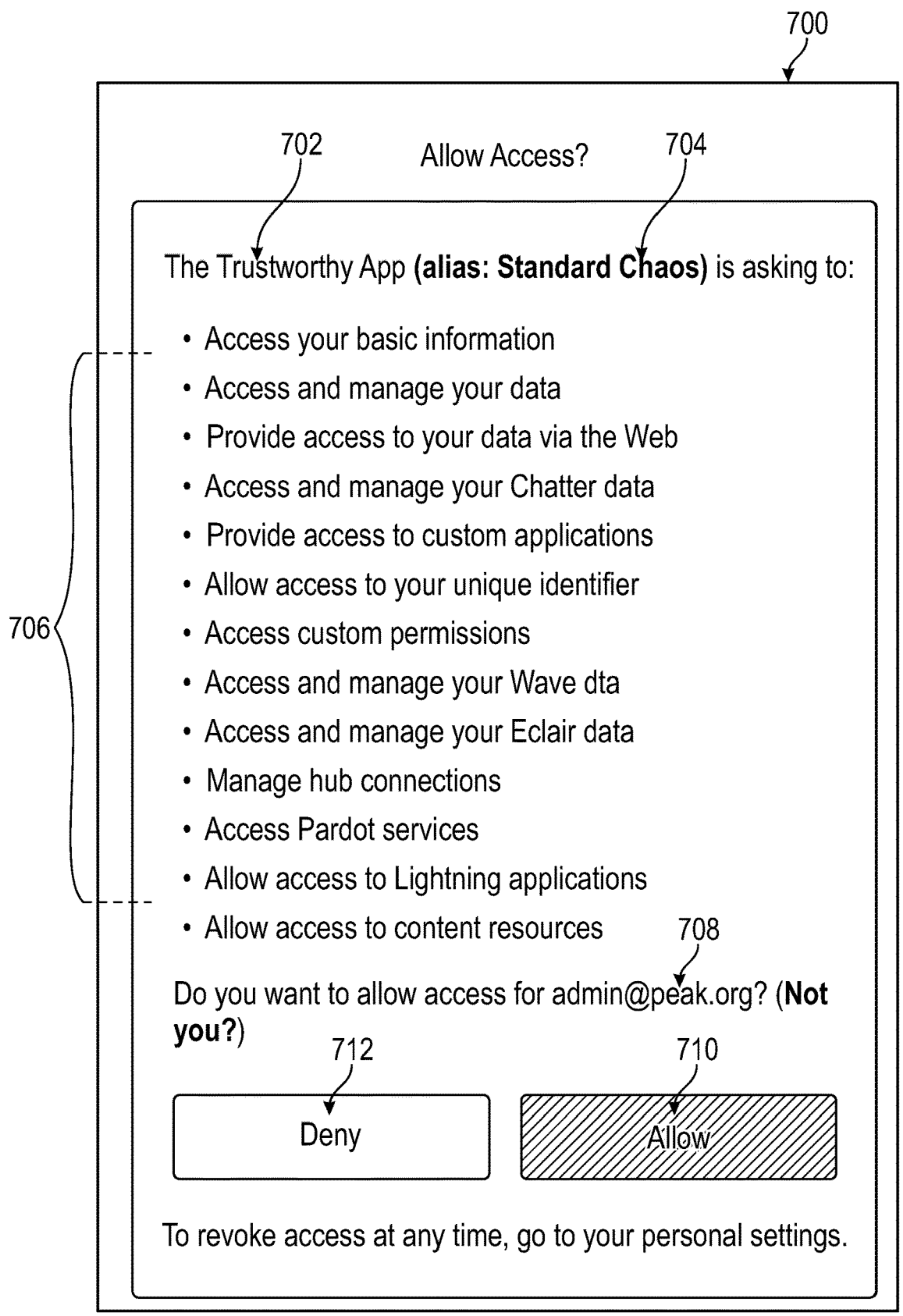
Figure 8:
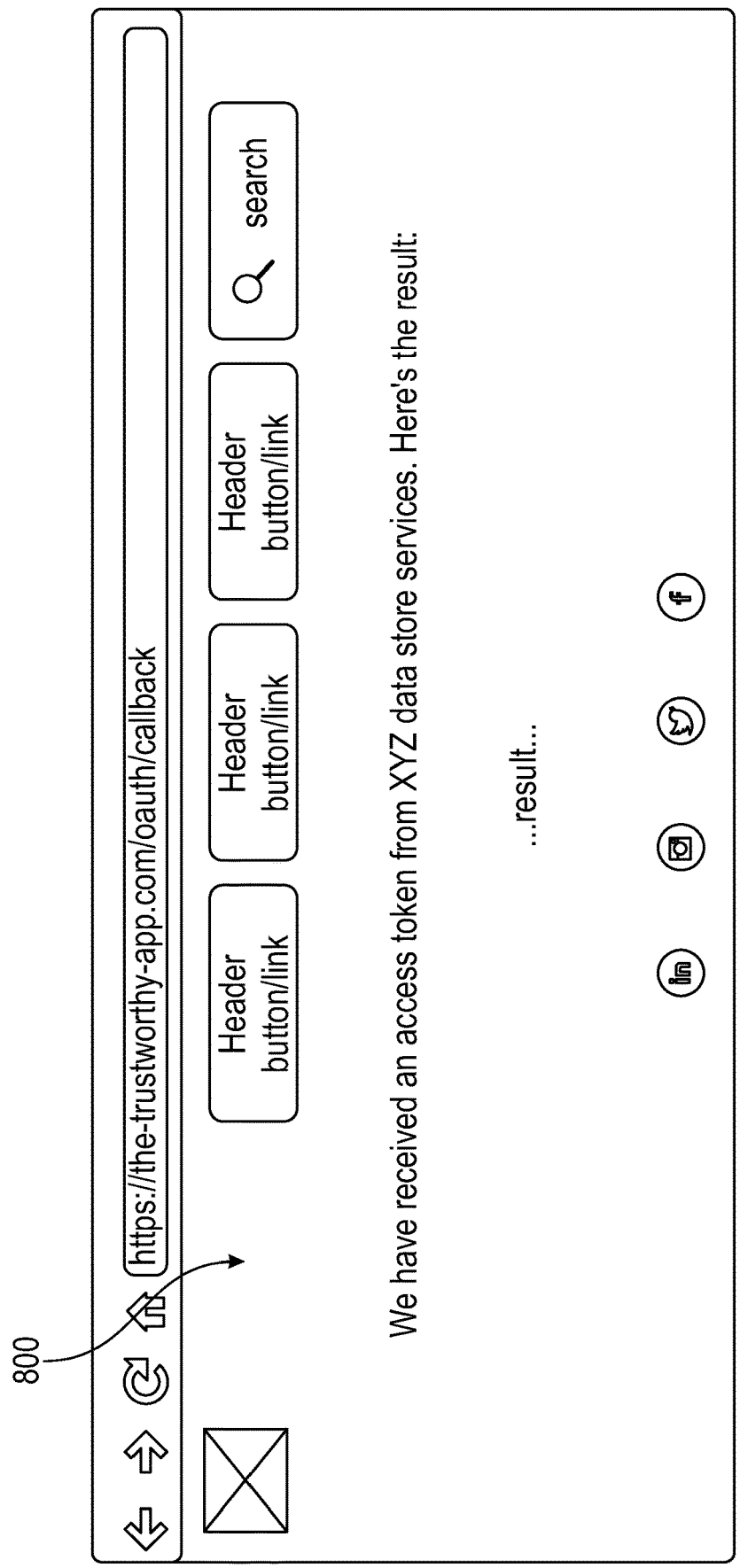

Referring to FIG. 6 with continued reference to FIGS. 1-3, a user of a client device 106 utilizes the client application 108 to access 306 a URL or other network location associated with the application server 102 (e.g., https://the-trustworthy-app.com) to generate an instance of the web application 104 at or within the client application 108. When the user interacts with the instance of the web application 104 in a manner that attempts or otherwise indicates a desire to incorporate the user's protected data or information maintained at a third party computing system 120 within the instance of the web application 104, the web application 104 generates or otherwise provides a web application GUI display 600 that indicates that the authorization process 200 needs to be performed. In the illustrated implementation, the web page for the web application GUI display 600 includes a hyperlink or similar selectable GUI element 602 for redirecting the client application 108 to a URL associated with an authorization consent GUI web page to be provided by the authentication service 112. In response to selection of the hyperlink 602, the client application 108 redirects to or otherwise accesses 308 a location at the authorization server 114 that results in the authorization service 112 generating an authorization consent web page GUI display 700 within the client application 108 (e.g., tasks 206, 208, 210), as depicted in FIG. 7.

To generate the authorization consent web page GUI display 700, the authentication service 112 accesses 310 the alias database 116 to retrieve the unique human-readable autogenerated alias assigned to the web application 104 along with other information maintained in the alias database 116 identifying one or more of the name of the web application 104, the developer associated with the web application 104, the protected third party resources to be accessed by the web application 104, the permissions to be granted to the web application 104, and/or the like. Although not illustrated in FIG. 7, in some embodiments, the authentication service 112 may perform or otherwise support a login procedure or other authentication process to authenticate the user of the client device 106 with respect to the third party computing system 120 prior to providing the authorization consent web page GUI display 700. In other words, the authentication service 112 may be configurable so that the authorization consent web page GUI display 700 is only provided to authenticated users of the third party computing system 120, thereby preventing inauthentic users from granting authorization.

The authorization consent web page GUI display 700 presented by the authentication service 112 within the client application 108 includes a graphical representation of the name 702 associated with the web application 104 (e.g., "The Trustworthy App") along with a graphical representation of the unique human-readable autogenerated alias (e.g., "Standard Chaos") associated with the web application 104 and a graphical indication 708 of the developer associated with the web application 104. In this manner, the user may verify or confirm that the depicted alias 704 is recognized by the user and matches the alias known to be associated with the web application 104 by virtue of the alias having been previously communicated to the user from the developer via a trustworthy communications channel (e.g., e-mail, text message, and/or the like). The authorization consent web page GUI display 700 also includes a graphical representation of the requested permissions 706 for the web application 104, which may include, for example, the particular types of the user's data or protected resources that the web application 104 is requesting access to, the particular functionality or uses with respect to the user's data or protected resources that the web application 104 is requesting permissions for, and/or other information that informs the user of how the web application 104 may attempt to access or otherwise utilize the user's protected resources. The authorization consent web page GUI display 700 includes a button 710 that may be selected by the user to authorize and grant the requested permissions to the web application 104, as well as a button 712 that may be selected by the user to deny authorization to the web application 104.

As described above, in response to receiving 312 user selection of the button 710 to authorize the web application 104, the authorization service 112 generates an access token for accessing the third party computing system 120 on behalf of the user (e.g., task 210) and provides 314 the access token to the web application 104 via the network 110 (e.g., task 212). In response to receiving the access token, the web application 104 transmits or otherwise provides 316 the access token to the resource server 122 in connection with a request for performing one or operations with respect to the user's data maintained in the resource database 124. After validating or otherwise verifying the access token, the resource server 122 accesses 318 the resource database 124 to obtain the requested data from the resource database 124 and/or perform the requested functionality at the resource database 124. The resource server 122 transmits or otherwise provides 320 the user's data from the resource database 124 resulting from performing the desired operation to the web application 104 via the network 110, which, in turn, generates 322 an updated web application GUI display 800 corresponding to the instance of the web application 104 within the client application 108 that includes or otherwise incorporates data or other information obtained from the third party computing system 120 as a result of the authorization process 200. For example, after generating the access token, the authorization service 112 may redirect the client application 108 to a URL or other address associated with the web application 104 that corresponds to the updated web page for the instance of the web application 104 that includes, incorporates or otherwise reflects the user's data obtained from the third party computing system 120 pursuant to the authorization process 200.

Referring again to FIGS. 1-2 with reference to FIGS. 3-8, by virtue of the authorization processes described herein, a user may be protected against spoofing or phishing attacks by using an autogenerated alias maintained by the authorization service 112 that includes at least some portion of the alias that is not editable, modifiable, or otherwise configurable by a potentially malicious actor to emulate another actor. For example, even if a malicious actor were to attempt to create a web application with a similar name to a verified application or developer (e.g., name squatting, typosquatting or the like), the malicious actor is still unable to alter or modify the autogenerated alias to emulate the autogenerated alias assigned to a verified application. In this regard, the authorization process described herein effectively allows the user to manually employ multi-factor authentication with respect to a web application before authorizing permissions, for example, by authenticating that a displayed alias assigned to the web application matches an alias known to be assigned to the web application, while also authenticating the name, developer, permissions, and/or other attributes associated with the web application are also authentic. Moreover, the autogenerated alias provides a simple, human-readable manner of authentication that can be utilized by a wide range of user without requiring deeper technical knowledge (e.g., analyzing and understanding redirect URLs, etc.). Additionally, while redirect URLs may be supplied by developers or users and could potentially be misused by a malicious or compromised actor, the control of the autogenerated alias is maintained by the authorization service, which prevents a malicious or compromised actor from copying or otherwise compromising the autogenerated alias assigned to a legitimate, verified web application.

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 9A:
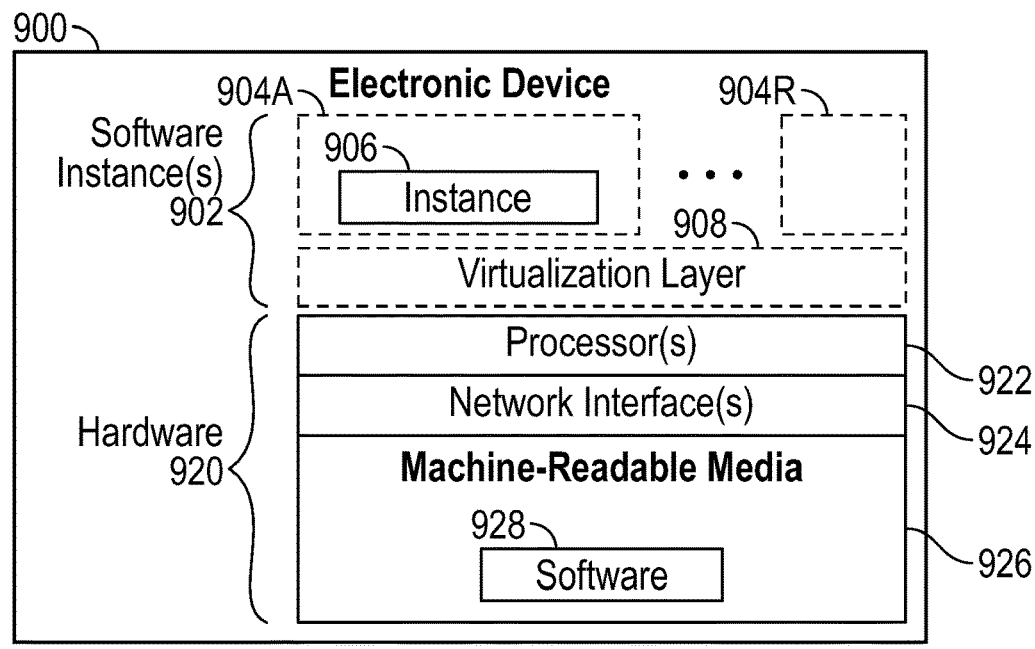
FIG. 9A is a block diagram illustrating an electronic device according to some example implementations.

FIG. 9A is a block diagram illustrating an electronic device 900 according to some example implementations. FIG. 9A includes hardware 920 comprising a set of one or more processor(s) 922, a set of one or more network interfaces 924 (wireless and/or wired), and machine-readable media 926 having stored therein software 928 (which includes instructions executable by the set of one or more processor(s) 922). The machine-readable media 926 may include non-transitory and/or transitory machine-readable media. Each of the previously described clients and the XYZ service may be implemented in one or more electronic devices 900. In one implementation: 1) each of the clients is implemented in a separate one of the electronic devices 900 (e.g., in end user devices where the software 928 represents the software to implement clients to interface directly and/or indirectly with the authorization service (e.g., software 928 represents a web browser, a native client, a portal, a command-line interface, and/or an application programming interface (API) based upon protocols such as Simple Object Access Protocol (SOAP), Representational State Transfer (REST), etc.)); 2) the authorization service is implemented in a separate set of one or more of the electronic devices 900

(e.g., a set of one or more server devices where the software 928 represents the software to implement the authorization service); and 3) in operation, the electronic devices implementing the clients and the authorization service would be communicatively coupled (e.g., by a network) and would establish between them (or through one or more other layers and/or or other services) connections for submitting authorization requests to the authorization service and returning access tokens to the clients. Other configurations of electronic devices may be used in other implementations (e.g., an implementation in which the client and the authorization service are implemented on a single one of electronic device 900).

During operation, an instance of the software 928 (illustrated as instance 906 and referred to as a software instance; and in the more specific case of an application, as an application instance) is executed. In electronic devices that use compute virtualization, the set of one or more processor(s) 922 typically execute software to instantiate a virtualization layer 908 and one or more software container(s) 904A-704R (e.g., with operating system-level virtualization, the virtualization layer 908 may represent a container engine (such as Docker Engine by Docker, Inc. or rkt in Container Linux by Red Hat, Inc.) running on top of (or integrated into) an operating system, and it allows for the creation of multiple software containers 904A-704R (representing separate user space instances and also called virtualization engines, virtual private servers, or jails) that may each be used to execute a set of one or more applications; with full virtualization, the virtualization layer 908 represents a hypervisor (sometimes referred to as a virtual machine monitor (VMM)) or a hypervisor executing on top of a host operating system, and the software containers 904A-704R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 928 is executed within the software container 904A on the virtualization layer 908. In electronic devices where compute virtualization is not used, the instance 906 on top of a host operating system is executed on the "bare metal" electronic device 900. The instantiation of the instance 906, as well as the virtualization layer 908 and software containers 904A-704R if implemented, are collectively referred to as software instance(s) 902.

Alternative implementations of an electronic device may have numerous variations from that described above. For example, customized hardware and/or accelerators might also be used in an electronic device.

Figure 9B:
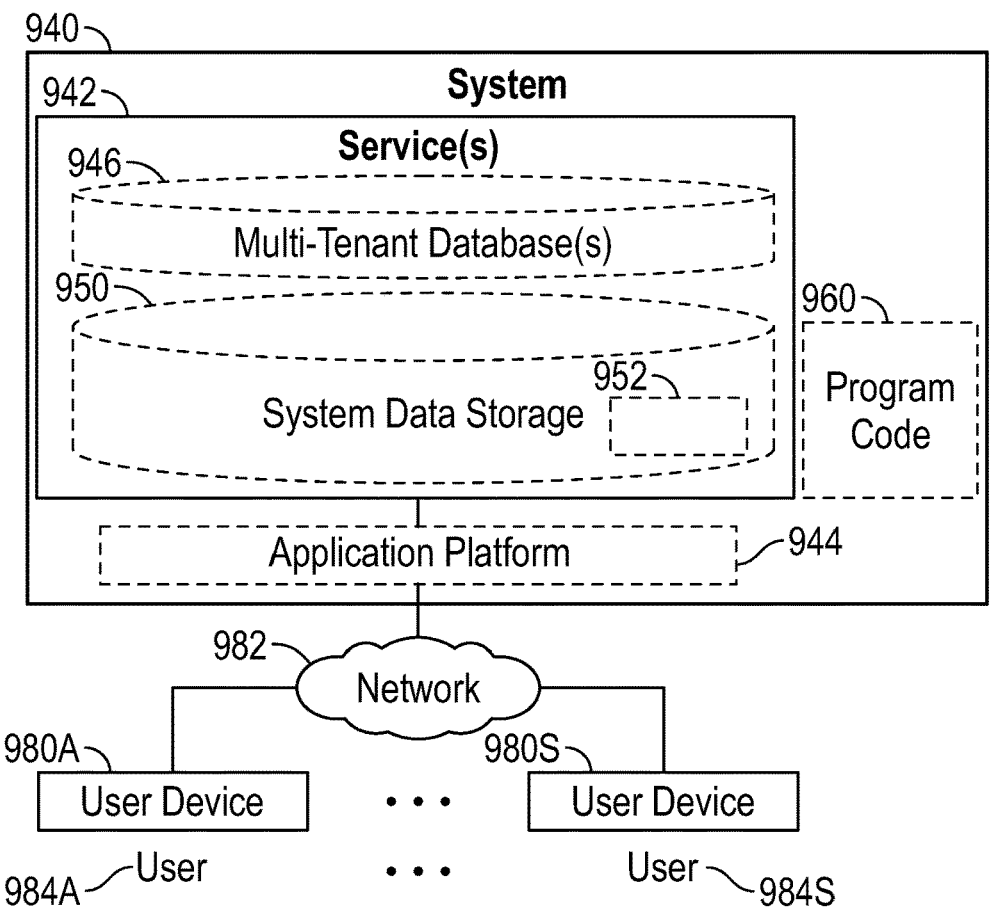
FIG. 9B is a block diagram of a deployment environment according to some example implementations.

FIG. 9B is a block diagram of a deployment environment according to some example implementations. A system 940 includes hardware (e.g., a set of one or more server devices) and software to provide service(s) 942, including the authorization service. In some implementations the system 940 is in one or more datacenter(s). These datacenter(s) may be: 1) first party datacenter(s), which are datacenter(s) owned and/or operated by the same entity that provides and/or operates some or all of the software that provides the service(s) 942; and/or 2) third-party datacenter(s), which are datacenter(s) owned and/or operated by one or more different entities than the entity that provides the service(s) 942 (e.g., the different entities may host some or all of the software provided and/or operated by the entity that provides the service(s) 942). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 940 is coupled to user devices 980A-380S over a network 982. The service(s) 942 may be on-demand services that are made available to one or more of the users 984A-384S working for one or more entities other than the entity which owns and/or operates the on-demand services (those users sometimes referred to as outside users) so that those entities need not be concerned with building and/or maintaining a system, but instead may make use of the service(s) 942 when needed (e.g., when needed by the users 984A-384S). The service(s) 942 may communicate with each other and/or with one or more of the user devices 980A-380S via one or more APIs (e.g., a REST API). In some implementations, the user devices 980A-380S are operated by users 984A-384S, and each may be operated as a client device and/or a server device. In some implementations, one or more of the user devices 980A-380S are separate ones of the electronic device 900 or include one or more features of the electronic device 900.

In some implementations, the system 940 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants. In one implementation, the system 940 is a multi-tenant cloud computing architecture supporting multiple services, such as one or more of the following types of services: Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Authorization; Authentication; Security; and Identity and access management (IAM). For example, system 940 may include an application platform 944 that enables PAAS for creating, managing, and executing one or more applications developed by the provider of the application platform 944, users accessing the system 940 via one or more of user devices 980A-380S, or third-party application developers accessing the system 940 via one or more of user devices 980A-380S.

In some implementations, one or more of the service(s) 942 may use one or more multi-tenant databases 946, as well as system data storage 950 for system data 952 accessible to system 940. In certain implementations, the system 940 includes a set of one or more servers that are running on server electronic devices and that are configured to handle requests for any authorized user associated with any tenant (there is no server affinity for a user and/or tenant to a specific server). The user devices 980A-380S communicate with the server(s) of system 940 to request and update tenant-level data and system-level data hosted by system 940, and in response the system 940 (e.g., one or more servers in system 940) automatically may generate one or more Structured Query Language (SQL) statements (e.g., one or more SQL queries) that are designed to access the desired information from the multi-tenant database(s) 946 and/or system data storage 950.

In some implementations, the service(s) 942 are implemented using virtual applications dynamically created at run time responsive to queries from the user devices 980A-380S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 960 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 944 includes an application setup mechanism that supports application developers' creation and management of applications, which may be saved as metadata by save routines. Invocations to such applications, including the authorization service, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 982 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $6^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 940 and the user devices 980A-380S.

Each user device 980A-380S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 940. For example, the user interface device can be used to access data and applications hosted by system 940, and to perform searches on stored data, and otherwise allow one or more of users 984A-384S to interact with various GUI pages that may be presented to the one or more of users 984A-384S. User devices 980A-380S might communicate with system 940 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 980A-380S might include an HTTP client, commonly referred to as a "browser," for sending and receiving HTTP messages to and from server(s) of system 940, thus allowing users 984A-384S of the user devices 980A-380S to access, process and view information, pages and applications available to it from system 940 over network 982.

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting. Accordingly, details of the exemplary implementations described above should not be read into the claims absent a clear intention to the contrary.

What is claimed is:

1. A method of authorizing access to a protected resource, the method comprising:
   receiving, by an authorization service, a registration request associated with a web application from a first client device;
   after receiving the registration request:
      providing, by the authorization service at the first client device, a registration web page graphical user interface (GUI) display including a first GUI element for a name of the web application;
      automatically assigning, by the authorization service, a unique autogenerated human-readable alias to the web application, wherein the unique autogenerated human-readable alias is automatically generated by the authorization service and is different from the name defined for the web application; and
      providing, by the authorization service at the first client device, an updated registration web page GUI display comprising a first graphical representation of the unique autogenerated human-readable alias assigned to the web application;
   receiving, by the authorization service from an instance of the web application from a network, a request for access to the protected resource on behalf of a user of the web application;
   in response to the request:
      accessing, by the authorization service, an alias database to retrieve the unique autogenerated human-readable alias assigned by the authorization service to the web application; and
      generating, by the authorization service within a client application at a second client device associated with the user, an authorization consent GUI display including a second graphical representation of the unique autogenerated human-readable alias automatically assigned by the authorization service to the web application and a third graphical representation of the name defined for the web application; and
   thereafter, in response to user selection of a third GUI element of the authorization consent GUI display:
      obtaining, by the authorization service, an access token associated with the user and the protected resource; and
      transmitting, by the authorization service, the access token to the web application.

2. The method of claim 1, wherein the registration request identifies a third party computing system associated with the protected resource and automatically assigning the unique autogenerated human-readable alias comprises:
   automatically identifying, by the authorization service, a first term for the unique autogenerated human-readable alias in accordance with a naming policy associated with the third party computing system;
   automatically generating, by the authorization service, a second term for the unique autogenerated human-readable alias; and
   assigning, by the authorization service, a combination of the first term and the second term to the web application as the unique autogenerated human-readable alias for the web application.

3. The method of claim 1, the protected resource comprising protected data associated with the user maintained in a record at a third party database system, wherein the client application comprises a browser application and transmitting the access token to the web application comprises the authorization service automatically redirecting the browser application at the second client device to a uniform resource locator (URL) address associated with the web application that includes the access token, wherein the web application utilizes the access token obtained from the URL address to retrieve the protected data from the third party database system.

4. The method of claim 1, wherein:
   providing the registration web page GUI display comprises providing the registration web page GUI display including a second GUI element for a callback uniform resource locator (URL) associated with the web application; and
   transmitting the access token comprises the authorization service redirecting the client application to the callback URL associated with the web application with the access token assigned to the web application as a URL parameter appended to the callback URL.

5. The method of claim 4, wherein the access token comprises a string including the unique autogenerated human-readable alias assigned to the web application.

6. The method of claim 4, further comprising writing, by the authorization service, authorization information to a row in a database that is accessible to a resource server associated with the protected resource, wherein the access token comprises a string that identifies the row in the database from which the resource server can retrieve the authorization information.

7. The method of claim 4, wherein receiving the request for access to the protected resource on behalf of the user of the web application comprises the web application utilizing a uniform resource locator (URL) provided by the authorization service during registration of the web application to redirect the client application to an authorization consent web page provided by the authorization service.

8. The method of claim 1, wherein the access token comprises a string including the unique autogenerated human-readable alias assigned to the web application.

9. The method of claim 1, further comprising writing, by the authorization service, authorization information to a row in a database that is accessible to a resource server associated with the protected resource, wherein the access token comprises a string that identifies the row in the database from which the resource server can retrieve the authorization information.

10. The method of claim 1, wherein at least some portion of the unique autogenerated human-readable alias is not editable, modifiable, or otherwise configurable to emulate another actor.

11. The method of claim 1, further comprising authenticating that the second graphical representation of the unique autogenerated human-readable alias matches an alias known to be assigned to the web application.

12. The method of claim 1, wherein:

the registration request identifies a third party computing system; and the authorization service automatically generates the unique autogenerated human-readable alias in accordance with a naming policy defined for the third party computing system.

13. The method of claim 12, further comprising writing, by the authorization service, authorization information to a row in a database that is accessible to a resource server of the third party computing system, wherein the access token comprises a string that identifies the row in the database from which the resource server can retrieve the authorization information.

14. The method of claim 1, wherein the updated registration web page GUI display comprises a selectable GUI element for the authorization service to regenerate additional potential aliases until arriving at an autogenerated alias that is satisfactory to a developer user of the first client device.

15. The method of claim 1, further comprising:

verifying, by the authorization service, that the unique autogenerated human-readable alias is unique with respect to existing aliases maintained in the alias database in association with other web applications; and after confirming the unique autogenerated human-readable alias is unique, updating, by the authorization service, the alias database to include an entry maintaining an association between the web application and the unique autogenerated human-readable alias.

16. A non-transitory machine-readable storage medium that provides instructions that, if executed by a processor, are configurable to cause said processor to perform operations comprising:

receiving a registration request associated with a web application from a first client device;

after receiving the registration request:
  providing, at the first client device, a registration web page graphical user interface (GUI) display including a first GUI element for a name of the web application;
  automatically assigning a unique autogenerated human-readable alias to the web application, wherein the unique autogenerated human-readable alias is automatically generated and is different from the name defined for the web application; and
  providing, at the first client device, an updated registration web page GUI display comprising a first graphical representation of the unique autogenerated human-readable alias assigned to the web application;

receiving a request for access to a third party computing system on behalf of a user of the web application from an instance of the web application;

in response to the request:
  accessing an alias database to retrieve the unique autogenerated human-readable alias assigned to the web application; and
  generating, within a client application at a second client device associated with the user, an authorization consent GUI display including a second graphical representation of the unique autogenerated human-readable alias automatically assigned to the web application and a third graphical representation of the name defined for the web application; and thereafter, in response to user selection of a third GUI element of the authorization consent GUI display:
  obtaining an access token associated with the third party computing system; and
  transmitting the access token to the web application.

17. The non-transitory machine-readable storage medium of claim 16, wherein the client application comprises a browser application and the instructions configurable to cause said processor to transmit the access token to the web application by automatically redirecting the browser application at the second client device to a uniform resource locator (URL) address associated with the web application that includes the access token for retrieving protected data associated with the user from the third party computing system.

18. An authorization system comprising:

a non-transitory machine-readable storage medium that stores software; and a processor, coupled to the non-transitory machine-readable storage medium, to execute the software that implements an authorization service and that is configurable to:

receive a registration request associated with a web application from a first client device;

after receiving the registration request:
  provide, at the first client device, a registration web page graphical user interface (GUI) display including a first GUI element for a name of the web application;
  automatically assign a unique autogenerated human-readable alias to the web application, wherein the unique autogenerated human-readable alias is automatically generated by the authorization service and is different from the name defined for the web application; and
  provide, at the first client device, an updated registration web page GUI display comprising a first graphical representation of the unique autogenerated human-readable alias assigned to the web application;

receive a request for access to a protected resource on behalf of a user of the web application from an instance of the web application over a network;

in response to the request:
  access an alias database to retrieve the unique autogenerated human-readable alias assigned by the authorization service to the web application; and
  generate, within a client application at a second client device associated with the user, an authorization consent GUI display including a second graphical representation of the unique autogenerated human-readable alias automatically assigned to the web application and a third graphical representation of the name defined for the web application; and thereafter, in response to user selection of a third GUI element of the authorization consent GUI display:
  obtain an access token associated with the user and the protected resource; and
  transmit the access token to the web application.

19. The authorization system of claim 18, wherein the software is configurable to verify the unique autogenerated human-readable alias is unique with respect to existing aliases maintained in the alias database in association with other web applications prior to updating the alias database to include an entry maintaining an association between the unique autogenerated human-readable alias and the web application.

20. The authorization system of claim 18, wherein the client application comprises a browser application and the software is configurable to transmit the access token to the web application by automatically redirecting the browser application at the second client device to a uniform resource locator (URL) address associated with the web application that includes the access token.

* * * * *